United States Patent [19]

del Valle

[11] 4,267,095

[45] May 12, 1981

[54] RESIN COMPOSITION

[75] Inventor: Clara J. del Valle, Midland, Mich.

[73] Assignee: The Dow Chemical Company, Midland, Mich.

[21] Appl. No.: 955,040

[22] Filed: Oct. 26, 1978

[51] Int. Cl.$^3$ .................. C08L 63/00; C08L 67/06; C08K 3/20; C08K 3/26

[52] U.S. Cl. ................ 260/40 R; 260/37 EP; 260/42.28; 525/531; 525/922

[58] Field of Search ............... 260/836, 837, 37 EP, 260/40 R, 42.28; 525/531

[56] References Cited

U.S. PATENT DOCUMENTS

| | | | |
|---|---|---|---|
| 4,041,008 | 8/1977 | Makhlouf | 260/40 R |
| 4,064,298 | 12/1977 | Schwartz | 260/45.75 W |
| 4,097,630 | 6/1978 | Schwartz | 428/97 |
| 4,157,997 | 6/1979 | De Mejo | 260/40 R |
| 4,159,977 | 7/1979 | Hsieh | 260/40 R |
| 4,183,843 | 1/1980 | Koenig | 260/40 R |

OTHER PUBLICATIONS

W. J. Connelly et al., Aluminum Hydrate Filler in Polyester Systems, Modern Plastics Sep. 1965 pp. 154, 156, 202.

P. V. Monsignore et al., 20th Annual Technical Conference 1974 Reinforced Plastics/Compositions Institute, The Society of the Plastics Industry Inc. Paper 23-c.

Kamata, Kazumasa et al., Chemical Abstracts, vol. 84, (1976) Abstract No. 31982K.

*Primary Examiner*—Paul Lieberman
*Attorney, Agent, or Firm*—James M. Kuszai; Bruce M. Kanuch

[57] ABSTRACT

A resin composition is disclosed. The composition comprises an organic resin, a halogenated flame retardant incorporated within the organic resin, and a synergistic smoke suppressive filler of calcium carbonate and alumina trihydrate.

19 Claims, 3 Drawing Figures

RESIN COMPOSITION

BACKGROUND OF THE INVENTION

The present invention relates generally to a resin composition, and more in particular to a filled, flame retardant, resin composition.

Organic resins and especially thermosettable resins, such as unsaturated polyester resins, are finding increasing utility in the preparation of plastic and particularly reinforced plastic molded articles. For example, molded polyester products reinforced with glass fiber have been used successfully in automotive, appliance, furniture, and electrical applications.

In many of these applications, the flammability of the organic resins is an important characteristic. Thus, numerous flame retardant compounds have been incorporated into the organic resins to modify the combustibility of the finished product. Illustrative of such flame retardant compounds are: non-reactive additives such as, for example, halogenated hydrocarbons, phosphates, hydrated alumina, antimony oxide and the like; and halogenated compounds which react with the organic resins and become bound as part of the polymeric matrix. Illustrative of such reactive halogenated compounds are dibromoneopentyl glycol, tetrabromophthalic anhydride, brominated pentaerythritolic polyesters, and the like. The use of reactive halogenated materials as flame retardants in organic resins is described, for example, by J. W. Lyons, "The Chemistry and Uses of Fire Retardants", Wiley Interscience, New York, 1970, pages 370-398.

In addition to a flame retardant, in many applications it is desirable to add inert extenders to displace by bulk at least a portion of the volume of the resin. Such inert extenders, commonly called "fillers," permit the control of density, rigidity, degradability, and cost of the final plastic material. Fillers are extensively used in resin molding formulations where it is unnecessary to maintain transparency in the finished product.

Numerous fillers are commercially available. The most commonly used fillers are calcium carbonate ($CaCO_3$), clay, short fiber asbestos, talc and alumina trihydrate ($Al_2O_3 \cdot 3H_2O$).

Calcium carbonate may be used at relatively high loading levels with minimum effect on the viscosity of the resin formulation. Moreover, calcium carbonate forms a relatively uniform dispersion throughout the resin, imparts good surface appearance to the finished product, and is a relatively low cost material. However, calcium carbonate contributes little or nothing to the flame retardant or smoke suppressive qualities of the resin composition. In fact, it is thought that the basic properties of calcium carbonate interfere with halogenated flame retardants. Consequently, the simultaneous use of the two components has heretofore been avoided.

Hydrated alumina ($Al_2O_3 \cdot 3H_2O$), also known as alumina trihydrate, is the filler most commonly used when it is desirable to impart flame retardant and smoke suppressive qualities to a filled resin system. For example, the use of alumina trihydrate in reinforced polyester plastics is described in the publication, P. V. Bonsignore, J. H. Manhart, 29th Annual Technical Conference 1974, Reinforced Plastics/-Composites Institute, The Society of the Plastics Industry, Inc., Paper 23-C. However, alumina trihydrate has numerous undesirable properties which detract from its use as a filler. For example, the dispersive properties of alumina trihydrate often yield a nonuniform product with poor molding qualities. In addition, alumina trihydrate can significantly increase the viscosity of the resin formulation. Moreover, alumina trihydrate is also generally more expensive than other commonly used fillers. Finally, the simultaneous use of alumina trihydrate and a halogenated flame retardant has heretofore been thought to significantly increase the smoke generated from a flame-exposed resin system. (See, for example, the publication of Bonsignore and Manhart, supra, p. 3, Table I, Examples 1 and 3.)

It is therefore desirable to develop a cost-effective resin composition which combines the properties of: high filler loading levels; uniform filler dispersion within the resin; satisfactory flame retardant properties, and reduced smoke generation.

SUMMARY OF THE INVENTION

The present invention is a resin composition comprising an organic resin, a halogenated flame retardant incorporated within the organic resin, and a synergistic filler of calcium carbonate and alumina trihydrate.

Quite surprisingly, when a mixture of calcium carbonate and alumina trihydrate is incorporated as filler in the resin composition, resins having excellent smoke suppressive and flame retardant qualities, and good molding properties are obtained. Moreover, the use of a mixture of calcium carbonate and alumina trihydrate allows a high loading of filler to be employed at a given viscosity. The unobvious and surprising nature of the present invention becomes even more pronounced when it is considered that neither calcium carbonate nor alumina trihydrate alone is capable of producing the same smoke suppressing effect in the resin as the mixture of these compounds at the same viscosity and at the same halogen flame retardant content of the resin. This fact clearly indicates the synergistic effect of the calcium carbonate-alumina trihydrate mixture on the smoke generation qualities of resin compositions.

DESCRIPTION OF THE INVENTION

Alumina trihydrate is an aluminum compound generally defined by the formulas $Al_2O_3 \cdot 3H_2O$ or $Al(OH)_3$. On a weight basis, this compound contains about 65 percent aluminum oxide ($Al_2O_3$) and about 35 percent water ($H_2O$). Commercially available grades of alumina trihydrate are quite suitable for the present purposes. A typical commercial grade of alumina trihydrate which can be used is sold by the Alcoa Chemical Division of the Aluminum Company of America under the trade name hydrated aluminum C-333.

Calcium carbonate is also a well-known compound defined by the formula $CaCO_3$. Commercially available grades of calcium carbonate are suitable for use in the present invention.

Both the calcium carbonate and the alumina trihydrate should be employed in a finely divided particulate state, since it is generally recognized in the art that the smaller the particle size of the filler, the more uniform its dispersion throughout the resin. An average particle size of about 50 microns or less has been found to be satisfactory. However, within the general state of the art of filled resins, the invention is not limited to any given particle size or distribution of particle sizes.

The smoke-suppressing filler combination of the present invention is a substantially uniform mixture of calcium carbonate and alumina trihydrate particles. Any combination of the two fillers can be used in the resin composition. However, it is preferred to use a mixture containing from about 10 to about 90 percent by weight of calcium carbonate and from about 90 to 10 percent by weight of aluminum trihydrate. For optimum smoke-suppressing characteristics, mixtures containing from about 60 to about 75 percent by weight alumina trihydrate, and about 25 to about 40 percent by weight calcium carbonate are employed.

In order to insure uniform distribution of the calcium carbonate-alumina trihydrate mixture within the resin, it is generally preferred that the components of the filler be thoroughly intermixed in the desired proportions before introduction into the resin composition. However, if desired, the individual components can be added separately to the resin composition. When this occurs, the weight ratios of the individual components relative to each other should still be kept within the limits previously defined.

Figure 1:
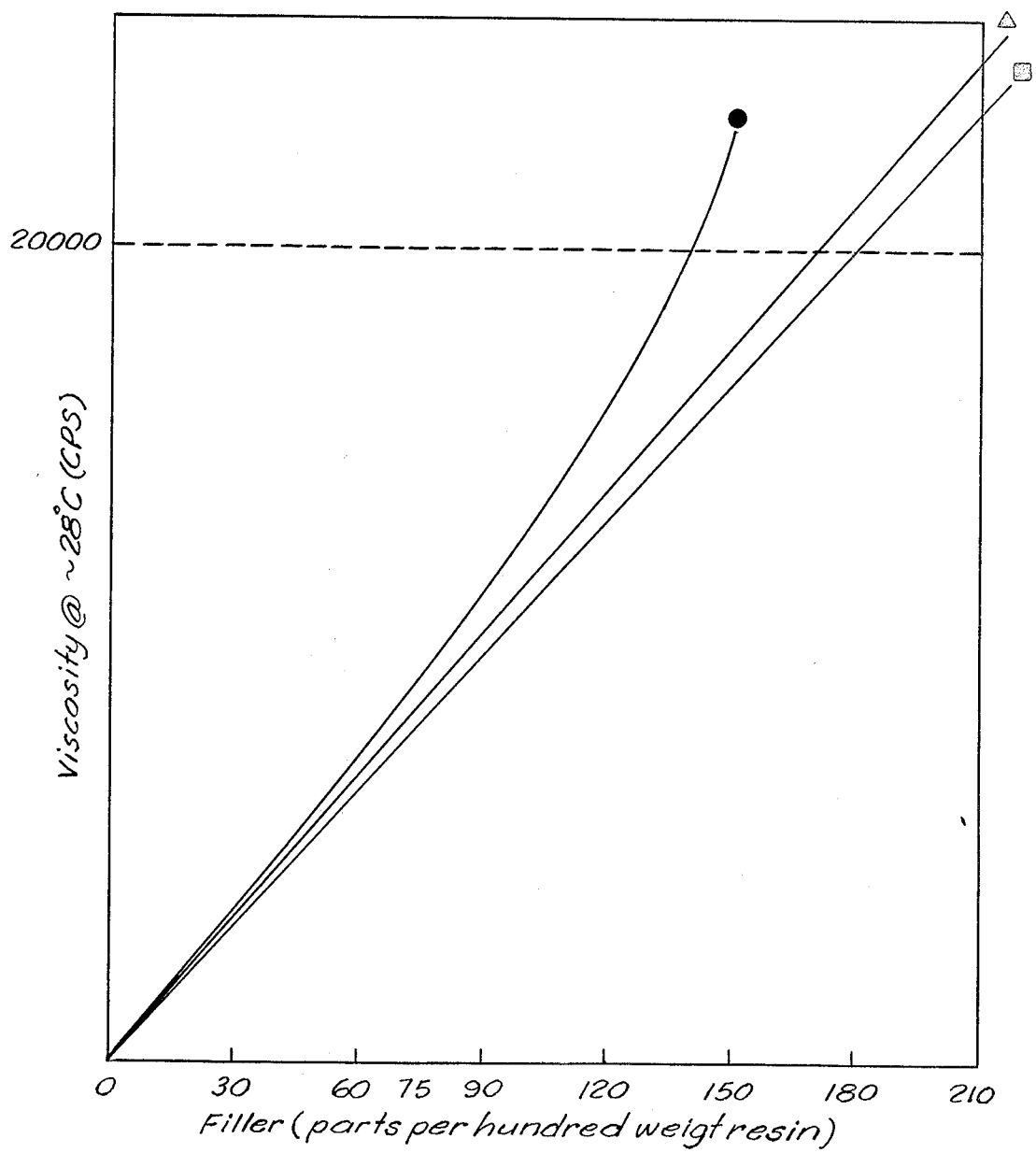
FIG. 1 graphically illustrates the relation between loading levels and viscosity of calcium carbonate, alumina trihydrate and a calcium carbonate-alumina trihydrate mixture.

The quantity of filler to be incorporated within the resin composition will, of course, depend upon the desired properties and viscosity of the final products. However, in the filled resin systems of the present invention, the filler loading is generally from about 40 to about 70 percent by weight, and preferably from about 55 to about 65 percent by weight, of the final resin composition. Filled systems containing less than about 40 percent by weight filler may be employed if desired. Generally at any given viscosity of the final resin composition, it is desirable to maximize the loading of filler. As graphically depicted in FIG. 1, the use of a mixed filler of calcium carbonate-alumina trihydrate at a viscosity of, for example, 20,000 centipoises gives a filler loading slightly greater than the average expected from the combination of calcium carbonate and alumina trihydrate.

In addition to the calcium carbonate-alumina trihydrate filler, the resin composition of the present invention also contains a reactive halogenated flame retardant incorporated within the organic resin.

It is recognized, of course, that all known organic resins will burn when subjected to a sufficiently intense heat source. Thus, the term "flame retardant" as used herein, is not intended to indicate performance under actual fire conditions.

The flame retardants which are suitable for incorporation into the organic resin are those that provide a halogen atom which is chemically bonded to the organic resin, yet dissociates upon being subjected to flammable conditions. Suitable flame retardants include, for example, dibromoneopentyl glycol, brominated pentaerythritol polyesters, pentabromoethyl benzene, pentabromotoluene, tetrabromophthalic anhydride, and the like. The preferred halogenated flame retardant is a brominated pentaerythritol polyester. Such polyesters are known in the art and can be prepared by well known methods. See, for example, the method taught in U.S. Pat. No. 3,891,605, which patent is incorporated herein by reference.

The quantity of halogenated flame retardant incorporated within the organic resin is that amount necessary to produce a halogen content in the final resin composition sufficient to allow the resin to pass a designated test for flame retardance. Depending upon the particular organic resin and the particular flame retardant with which it is combined, the quantity of flame retardant employed should be sufficient to provide up to about 35 percent by weight halogen. For most resin compositions, the flame retardant provides from about 1 to about 25 percent by weight halogen. A particularly preferred quantity of flame retardant provides from about 1 to about 10 percent by weight halogen.

The halogenated flame retardants may be incorporated into the organic resins by techniques which are known to those skilled in the art. See, for example. J. M. Lyons, "The Chemistry and Use of Fire Retardants", Wiley-Interscience, New York, 1970 and Z. E. Jolles, "Bromine and Its Compounds", Academic Press, New York, 1966.

In addition to the halogenated flame retardant and the filler, the resin composition also contains an organic resin. Thermosetting organic resins represent a preferred genus of resin finding use within the present composition. Unsaturated polyester resins represent one class of thermosetting resins especially suited for use in the present invention.

A wide variety of unsaturated polyesters which are readily available or can be prepared by methods well known to the art can be utilized. Such polyesters result from the condensation of polybasic carboxylic acids and compounds having several hydroxyl groups, e.g., polyhydroxy alcohols or alkylene oxides. Generally, in the preparation of suitable polyesters, and ethylenically unsaturated dicarboxylic acid such as maleic acid, fumaric acid, itaconic acid, or the like is inter-esterified with an alkylene glycol or polyalkylene glycol having a molecular weight of up to about 2000. Frequently, dicarboxylic acids free of ethylenic unsaturation such as phthalic acid, isophthalic acid, adipic acid, succinic acid, and the like, may be employed within a molar range of 0.25 to as much as 15 moles per mole of the unsaturated dicarboxylic acid. It will be understood that the appropriate acid anhydrides when they exist may be used and usually are preferred when available.

The glycol or polyhydric alcohol component of the polyester is usually stoichiometric or in slight excess with respect to the sum of the acids. The excess of polyhydric alcohol seldom will exceed 20–25 percent and usually is about 10 to 15 percent.

These unsaturated polyesters may be generally prepared by heating a mixture of the polyhydric alcohol with the dicarboxylic acid or anhydride in the proper molar proportions at elevated temperatures, usually at about 150° to 225° C. for a period of time ranging from about 1 to 5 hours.

Polymerization inhibitors such as t-butyl catechol may be advantageously added. It is also possible to prepare unsaturated polyesters directly from the appropriate oxide rather than the glycol, e.g., propylene oxide may be used in place of propylene glycol. Generally, the condensation (polymerization) reaction is continued until the acid content drops to about 2 to 12 percent (—COOH) and preferably from 4 to 8 percent.

When an unsaturated anhydride such as maleic anhydride is used, an unsaturated polyester is produced which contains polymerizable double bonds. Curing by copolymerization of a reactive, volatile monomer such as styrene with the unsaturated polyester results in a three dimensional rigid network. In addition to styrene, a variety of ethylenically unsaturated monomers such as methyl methacrylate, vinyl toluene, α-methyl styrene, divinyl benzene, the halogenated styrenes, diallyl phthalate, triallyl cyanurate or mixtures of the above may be used. Additional monomers are also listed on page 30, Table II-1.7 in "Handbook of Reinforced Plastics", 1964, S. S. Oleesky and G. Mohr, Reinhold Publishing Corp., New York. The particular choice of monomer and the specific composition of the unsaturated polyester are dependent on the properties ultimately desired in the cured article and are known or readily determined by those skilled in the art. Additional valuable information useful in selecting the resin and monomer can also be found on pages 13-55 in the above reference.

Another class of thermosetting resin suitable for use in the present invention is vinyl ester resins. Vinyl ester resins are described in U.S. Pat. Nos. 3,367,992 and 3,564,074 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from monocarboxylic acids such as acrylic and methacrylic acid. Bowen also describes alternate methods of preparation wherein a glycidyl methacrylate or acrylate is reacted with the sodium salt of a dihydric phenol such as bisphenol A. Vinyl ester resins based on epoxy novolac resins are described in U.S. Pat. No. 3,301,743 to Fekete et al. Fekete at al. also describes in U.S. Pat. No. 3,256,226 vinyl ester resins wherein the molecular weight of the polyepoxide is increased by reacting a dicarboxylic acid with the polyepoxide resin as acrylic acid, etc. Other difunctional compounds containing a group which is reactive with an epoxide group, such as amine, mercaptan and the like, may be utilized in place of the dicarboxylic acid. All of the above-described resins, which contain the characteristic linkages

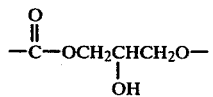

and terminal, polymerizable vinylidene groups, are classified as vinyl ester resins, and are incorporated herein by reference.

Briefly, any of the known polyepoxides may be employed in the preparation of the vinyl ester resins of the invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters as well as epoxidized unsaturated polyesters, so long as they contain more than one oxirane group per molecule. The polyepoxides may be monomeric or polymeric.

Preferred polyepoxides are glycidyl polyethers of polyhydric alcohols or polyhydric phenols having weights per epoxide group of about 150 to 2000. These polyepoxides are usually made by reacting at least about two moles of an epihalohydrin or glycerol dihalohydrin with one mole of the polyhydric alcohol or polyhydric phenol, and a sufficient amount of a caustic alkali to combine with the halogen of the halohydrin. The products are characterized by the presence of more than one epoxide group per molecule, i.e., a 1,2-epoxy equivalency greater than one.

Unsaturated monocarboxylic acids include acrylic acid, methacrylic acid, halogenated acrylic or methacrylic acid, cinnamic acid and the like and mixtures thereof, and hydroxyalkyl acrylate or methacrylate half esters of dicarboxy acids as described in U.S. Pat. No. 3,367,992 wherein the hydroxyalkyl group perferably has from 2 to 6 carbon atoms.

Yet, another embodiment of this invention utilizes a vinyl ester/unsaturated polyester resin composition wherein the weight ratio of said polyester to said vinyl ester ranges up to 2:3. The composition may be prepared either by physically mixing the two resins in the desired weight proportions or by preparing said vinyl ester resin in the presence of said unsaturated polyester.

Preferably the thermosettable resin phase comprises from 40 to 70 weight percent of the vinyl ester or polyester resin and from 60 to 30 percent of a copolymerizable monomer. Suitable monomers must be essentially water insoluble to maintain the monomer in the resin phase in the emulsion, although complete water insolubility is not required and a small amount of monomer dissolved in the emulsified water does no harm.

Suitable monomers include vinyl aromatic compounds such as styrene, vinyl toluene, divinyl benzene, and the like; saturated alcohols such as methyl, ethyl, isopropyl, octyl, etc.; esters of acrylic acid or methacrylic acid; vinyl acetate; diallyl maleate; dimethallyl fumarate; mixtures of the same, and all other monomers which are capable of copolymerizing with the vinyl ester resin and are essentially water insoluble.

Another embodiment of this invention utilizes a modified vinyl ester resin wherein about 0.1 to 0.6 mole of a dicarboxylic acid anhydride per equivalent of hydroxyl is reacted with the vinyl ester resin. The stability of the water-in-resin emulsion prepared from said modified vinyl ester resin is somewhat less, comparatively, than that found with unmodified vinyl ester resins, yet the stability is significantly improved over the art. Both saturated and unsaturated acid anhydrides are useful in said modification.

Suitable dicarboxylic acid anhydrides containing ethylenic unsaturation include maleic anhydride, the citraconic anhydride, itaconic anhydride and the like and mixtures thereof. Saturated dicarboxylic acid anhydrides include phthalic anhydride, anhydrides of aliphatic unsaturated dicarboxylic acid and the like. The modified vinyl ester resin is utilized in this invention in the same manner as already described for the unmodified vinyl ester resin.

Although the thermosetting resins are preferred, the organic resins suitable for use in the present compositions can also include other resins, such as the thermoplastics, which are capable of being formulated wth fillers and fabricated into useful molded articles. In such cases, the resins should have a softening or fabricating temperature which is below the decomposition temperature of the filler and flame retardant.

In addition to the components set forth above, it is also within the scope of the present invention to employ other materials in the resin composition where it is desirable to achieve a particular end result. These materials include, for example, reinforcing agents, antimicrobial agents, anti-oxidants, ultraviolet absorbers, discoloration inhibitors, heat stabilizers, and the like. The amount of the above-described materials employed in the resin composition can be any quantity which will not substantially adversely affect the synergistic smoke suppressive results derived from the present invention compositions.

It is preferred to also employ certain compounds which when used with the halogenated flame retardant will promote a cooperative effect therebetween and thus enhance the flame retardancy of the resultant composition. These "synergistic flame retardant agents" are well known in the art and include the oxides and halides of antimony, bismuth, arsenic, tin; and organic and inorganic compounds of phosphorus, nitrogen, boron, and sulfur. The preferred synergistic flame retardant agent is antimony trioxide. Generally, the agent is employed in an amount sufficient to provide an agent-halogen weight ratio of from about 1:1 to about 1:10, preferably about 1:3. However, larger or smaller amounts of the agent may be employed if desired.

The curing of the resin compositions of this invention is usually carried out after the resin has been shaped into an article of the desired form. Curing is effected by conventional means including the application of heat and/or pressure in the presence of a free radical yielding catalyst. Suitable catalysts include, for example, benzoly peroxide, methyl ethyl ketone peroxide, lauroyl peroxide, t-butyl hydroperoxide, potassium sulfate, and the like. The amount of catalyst will vary usually between about 0.1 to 5 percent by weight of the resin composition. Temperatures of curing can also be varied over wide limits, generally in the range of from about 60° to about 250° C. More rapid curing of the thermosettable resin composition may be accomplished by the addition of well-known accelerating agents, usually in concentrations ranging from about 0.1 to about 5 percent by weight of the resin.

The invention is further illustrated by the following examples:

EXAMPLE 1

A 23.77 gram (g) sample of an unsaturated polyester resin in styrene (approximately 37 percent by weight styrene) obtained from the W. R. Grace & Co. and identified as GR-63003, was charged to a reaction vessel. The unsaturated polyester resin had the following characteristics:

| Viscosity at 77° F. | 1000–1300 cps; |
| Specific Gravity | 1.12; and |
| Thixotropic Index | 1 |

The unsaturated polyester resin was then thoroughly mixed with 5.94 g of a reactive dibromoneopentyl glycol based polyester, manufactured and sold by The Dow Chemical Company as FR-1540.

A mixture of 24.14 g of calcium carbonate and 24.14 g of alumina trihydrate (50/50 weight ratio) was then added to the polyester resin along with 0.69 g of antimony oxide. When the mixture of ingredients was substantially homogeneous, 0.29 g of t-butyl perbenzoate (catalyst) and 0.15 g of a mixture of alkyl phosphates mold release agent (Zelec ® UN-E. I. du Pont de Nemours & Company, Wilmington, Delaware) were added. The resin composition had a viscosity at 28° C. of about 20,000 cps.

Approximately 26 g of ¼ inch fiberglas material were cut into 3 by 9 inch sample panels and impregnated with the resin composition described above. The sample panels were pressed in a press for two minutes at 175° C. with 40,000 pounds of pressure.

The panels were analyzed and found to contain 7 percent bromine based on the weight of the resin, 25 percent glass fibers based on the total weight of the panel; 2.1 percent $Sb_2O_3$, and 162 parts per hundred weight resin of calcium carbonate and alumina trihydrate. The samples were tested for flame retardancy and smoke inhibition.

The flame retardancy was determined by subjecting the panels to the standard tests for flammability of plastic Materials, Vertical Burning Tests of Classifying materials 94V-0 and 94V-5 (Underwriters Laboratories 1973). All panels tested passed both the V-0 and V-5 tests.

Evaluations for the density of visible smoke were made using a commerical smoke density chamber modeled after one developed at the National Bureau of Standards by the Fire Research Group (see D. Gross, J. J. Loftus and A. F. Robertson, ASTM Special Technical Publication 442, pages 166–204 (1969)). This chamber contains a radiant heater producing 2.5 $W/cm^2$ of heat at the surface of a 3×3 inch sample, a propane-air pilot burner and a vertical beam of light with a photo-air pilot burner and a vertical beam of light with a photo-multiplier tube detector and microphotometer to record the attenuation of light by smoke developing in the chamber. During smoke testing, the chamber is sealed to enclose the combustion products and smoke. The smoke developed was recorded as DMC (specific optical density at corrected maximum smoke intensity). The panels tested exhibited a DMC of about 270.

Comparative Tests

Figure 2:
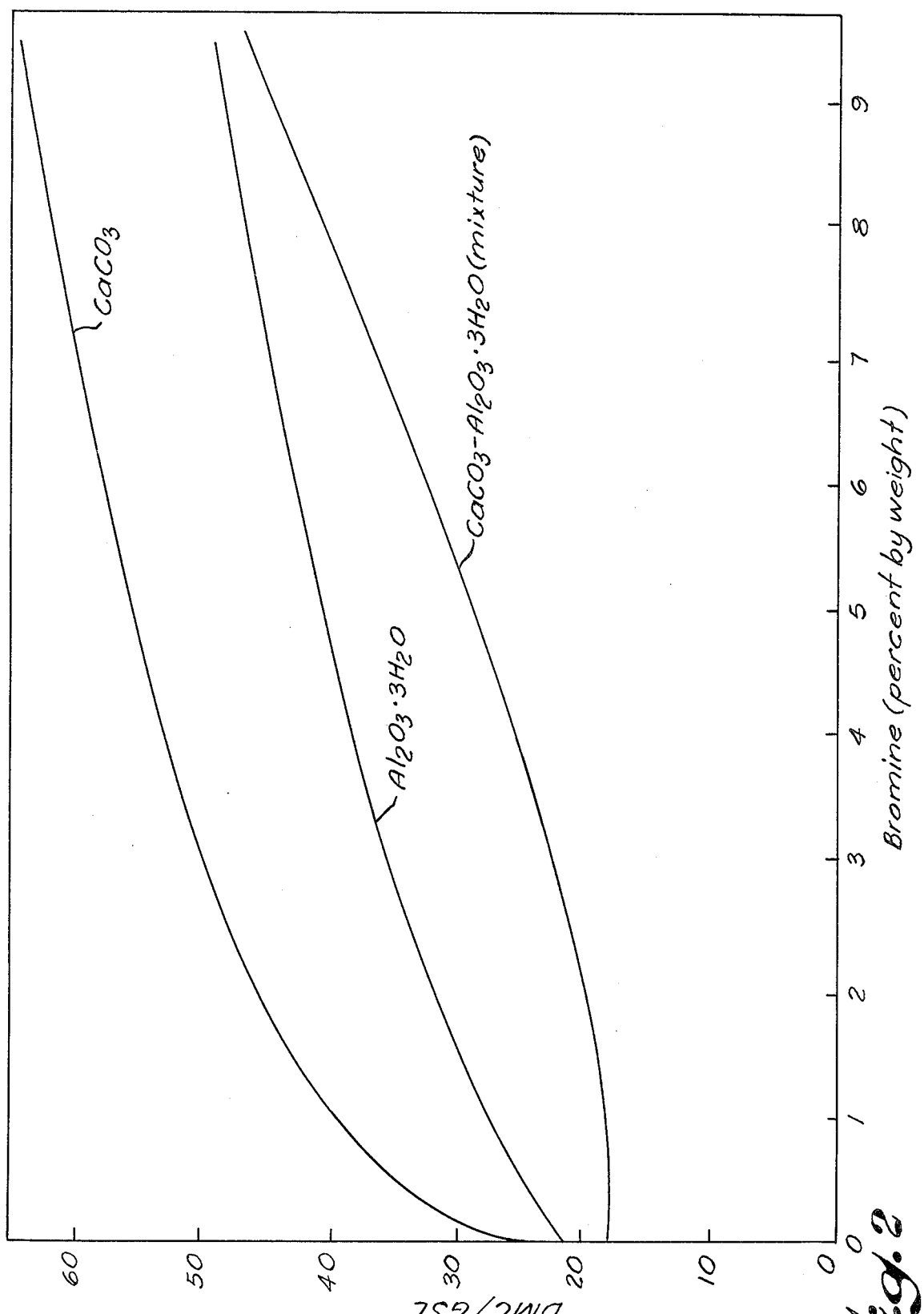
FIG. 2 graphically illustrates the smoke suppressive qualities of alumina trihydrate, calcium carbonate, and a calcium carbonate-alumina trihydrate mixture at various loadings of bromine in the resin.

To establish the effect of employing a mixture of calcium carbonate and alumina trihydrate on the smoke suppressing qualities of the resin composition, unsaturated polyester panels were prepared from resin compositions identical to that described above except only calcium carbonate and alumina trihydrate were used as fillers and the amount of bromine was varied. FIG. 2 graphically depicts the unexpected reduction in smoke generation achieved by using the mixture of calcium carbonate and alumina trihydrate in accordance with Example 1 of the present invention.

Figure 3:
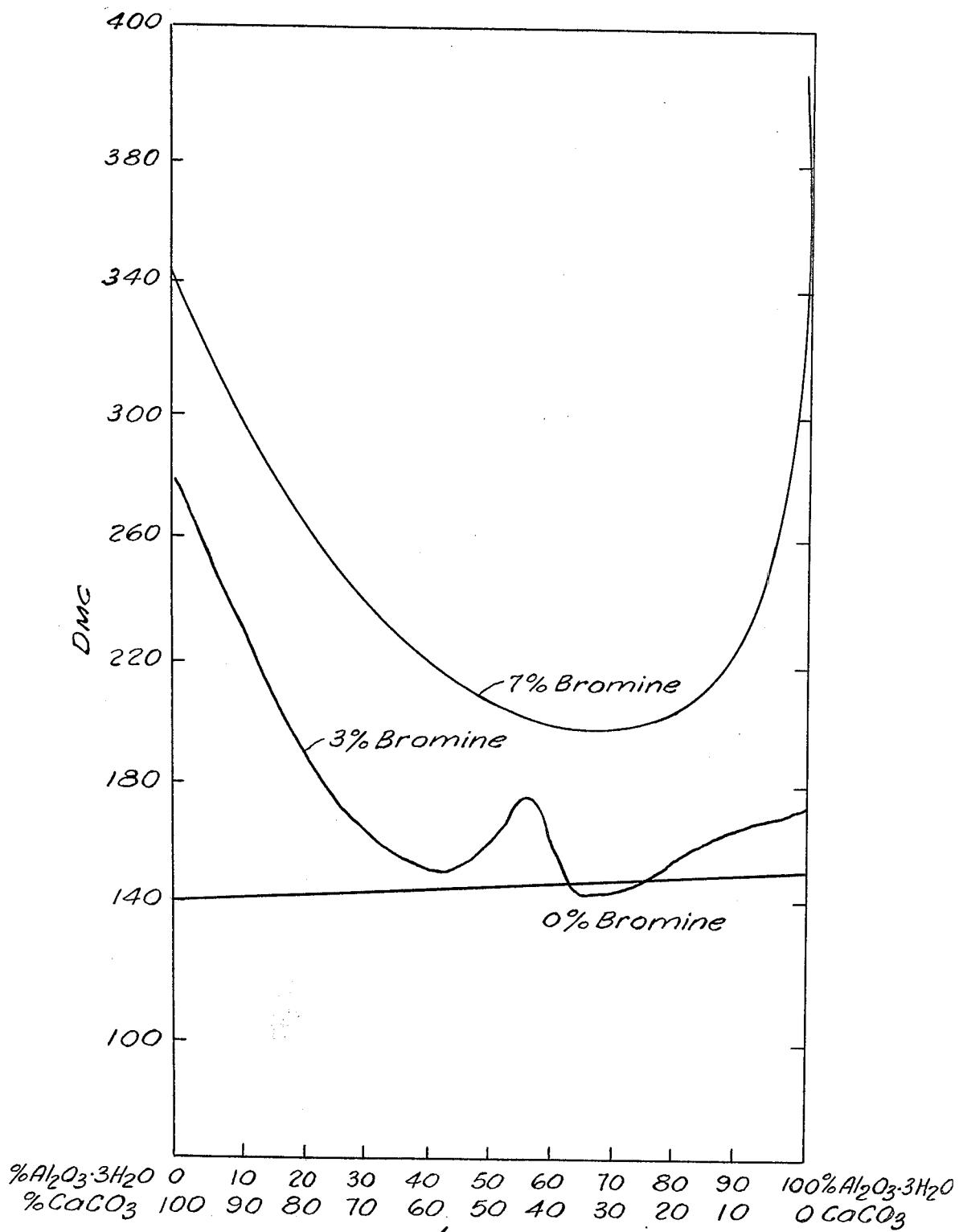
FIG. 3 shows the relationship of smoke generation to varying calcium carbonate to alumina trihydrate mixture ratios at various loadings of bromine in the resin.

Another series of unsaturated polyester panels was prepared according to the process described in Example 1. The amount of alumina trihydrate and calcium carbonate employed in admixture were varied between 0 and 100 percent. The smoke generation achieved by various mixtures is graphically depicted at various bromine levels in FIG. 3. From FIG. 3, it can be seen that the use of a mixture of calcium carbonate-alumina trihydrate in the presence of a halogenated flame retardant unexpectedly reduces the smoke generated by the resin.

Although the invention has been described in detail, it is not limited to the specific embodiments shown but may be varied in many respects within the scope of the basic concept thereof.

What is claimed is:

1. A resin composition comprising: an organic resin selected from the group consisting of polyester, vinylester and mixtures thereof, an organic halogenated flame retardant incorporated within said organic resin so that halogen atoms are bonded to said organic resin in an amount sufficient to impart flame retardancy to said organic resin, and a synergistic smoke suppressive filler of calcium carbonate and alumina trihydrate.

2. The resin composition of claim 1 wherein the thermosettable resin is a vinyl ester resin prepared by reacting about equivalent proportions of an unsaturated monocarboxylic acid and a polyepoxide resin, said vinyl ester resin containing

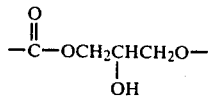

linkage groups and terminal vinylidene groups attached to the ester end of said linkage.

3. The resin composition of claim 2 wherein the thermosettable resin is an unsaturated polyester.

4. The resin composition of claim 3 wherein said unsaturated polyester is diluted with an ethylenically unsaturated monomer.

5. The resin composition of claim 4 wherein the ethylenically unsaturated monomer is selected from the group consisting of styrene, methyl methacrylate, vinyl toluene, α-methyl styrene, divinyl benzene, halogenated styrenes, diallyl phthalate, triallyl cyanurate and mixtures thereof.

6. The resin composition of claim 4 wherein the ethylenically unsaturated monomer is styrene.

7. The resin composition of claim 1 wherein the halogenated flame retardant is selected from the group consisting of dibromoneopentyl glycol, brominated pentaerythritol polyesters, pentabromoethyl benzene, tetrabromophthalic anhydride, and pentabromotoluene.

8. The resin composition of claim 1 wherein the halogenated flame retardant is dibromoneopentyl glycol.

9. The resin composition of claim 1 wherein the halogenated flame retardant is a brominated pentaerythritol polyester.

10. The resin composition of claim 1 wherein the filler contains from about 10 to about 90 percent by weight alumina trihydrate and from about 10 to about 90 percent by weight calcium carbonate.

11. The resin composition of claim 1 wherein the filler contains from about 60 to about 75 percent by weight alumina trihydrate and from about 25 to about 40 percent by weight calcium carbonate.

12. The resin composition of claim 1 wherein sufficient amounts of the halogenated flame retardant are present to provide from about 1 to about 25 percent by weight halogen in the resin composition.

13. The resin composition of claim 1 wherein sufficient amounts of the halogenated flame retardant are present to provide from about 1 to about 10 percent by weight halogen in the resin composition.

14. The resin composition of claim 1 containing from about 40 to about 70 percent by weight of the filler.

15. The resin composition of claim 1 containing from about 55 to about 65 percent by weight of the filler.

16. The resin composition of claim 1 wherein there is also present a flame retardant synergistic agent.

17. The resin composition of claim 16 wherein the flame retardant synergistic agent is antimony trioxide.

18. A molding composition comprising: (a) an unsaturated polyester resin; (b) from about 40 to about 70 percent by weight of a filler mixture of calcium carbonate and alumina trihydrate in synergistic combination to suppress smoke; and (c) from about 1 to about 25 percent by weight bromine in the form of a brominated pentaerythritol polyester flame retardant.

19. A shape article produced from the molding composition of claim 18.

* * * * *

UNITED STATES PATENT AND TRADEMARK OFFICE
CERTIFICATE OF CORRECTION

PATENT NO. : 4,267,095

DATED : May 12, 1981

INVENTOR(S) : Clara J. del Valle

It is certified that error appears in the above—identified patent and that said Letters Patent is hereby corrected as shown below:

Col. 4, line 21, after "example" insert --,--.

Col. 4, line 39, delete "and" and insert --an--.

Col. 5, line 37, after "Fekete", second occurrence, delete "at" and insert --et--; same line, delete "describes" and insert --describe--.

Col. 5, line 57, last word in line, delete "the" and insert --this--.

Col. 6, line 13, delete "dicarboxy" and insert --dicarboxyl--.

Col. 6, line 14, delete "perferably" and insert --preferably--.

Col. 6, line 62, delete "wth" and insert --with--.

Col. 7, line 30, delete "benzoly" and insert --benzoyl--.

Col. 8, line 17, delete "Materials" and insert --materials--;
line 17, delete "of" and insert --for--;
line 18, delete "materials" and insert --Materials.
line 22, delete "commerical" and insert --commercial--;
line 26, delete "442" and insert --422--.

Col. 10, Claim 19, delete "shape" and insert --shaped--.

Signed and Sealed this

Sixth Day of October 1981

[SEAL]

Attest:

GERALD J. MOSSINGHOFF

*Attesting Officer*     *Commissioner of Patents and Trademarks*